C. GUSTAFSON.
SAW DRESSING TOOL.
APPLICATION FILED JUNE 14, 1920.

1,396,682.

Patented Nov. 8, 1921.
2 SHEETS—SHEET 1.

WITNESSES

INVENTOR
C. Gustafson
H. J. Sanders
ATTORNEY.

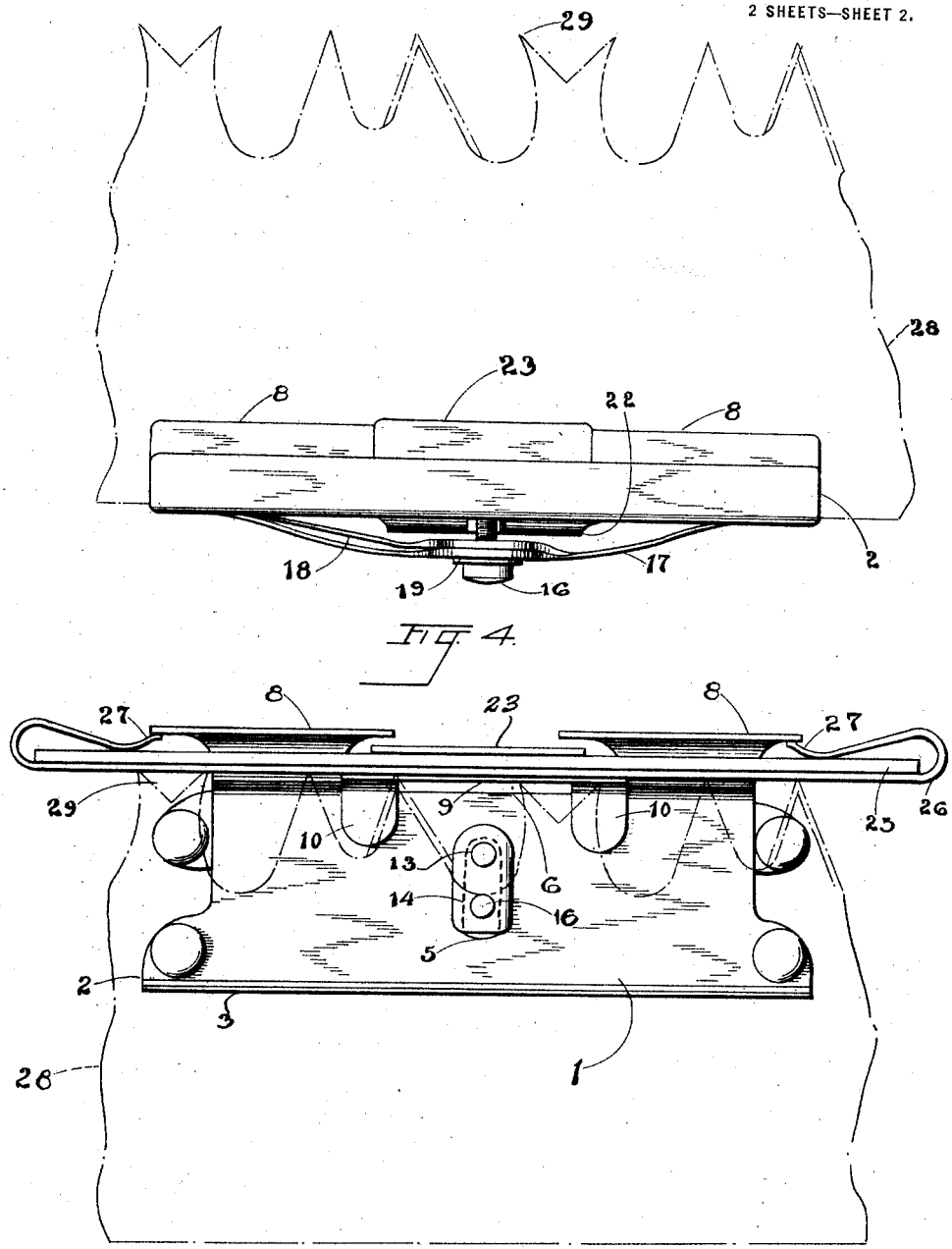

UNITED STATES PATENT OFFICE.

CHARLES GUSTAFSON, OF INSTANTER, PENNSYLVANIA.

SAW-DRESSING TOOL.

1,396,682. Specification of Letters Patent. Patented Nov. 8, 1921.

Application filed June 14, 1920. Serial No. 388,907.

*To all whom it may concern:*

Be it known that I, CHARLES GUSTAFSON, a subject of the King of Sweden, residing at Instanter, in the county of Elk and State of Pennsylvania, have invented certain new and useful Improvements in Saw-Dressing Tools, of which the following is a specification.

This invention relates to improvements in saw dressing tools and its object is to provide a tool of this class that is simple in construction, positive and efficient in operation and cheap to manufacture. With the foregoing and other objects in view the invention consists in the combination and arrangement of parts to be hereinafter fully described, pointed out in the appended claims and illustrated in the accompanying drawings which form a part of this specification and in which—

Fig. 4 is an inverted plan view of Fig. 1 showing a saw blade supported thereby.

Fig. 5 is a side elevation reverse to Fig. 1 showing a saw file supported in the tool and applied to a saw blade.

Like reference characters denote corresponding parts throughout the several views.

Figure 3:
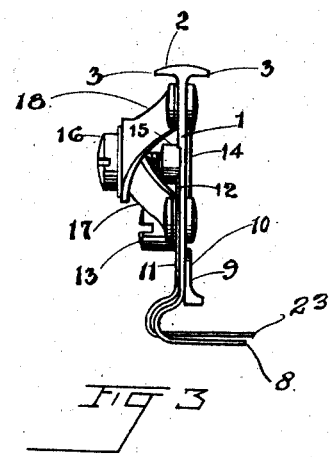
Fig. 3 is a top plan view of Fig. 1.
Figure 2:
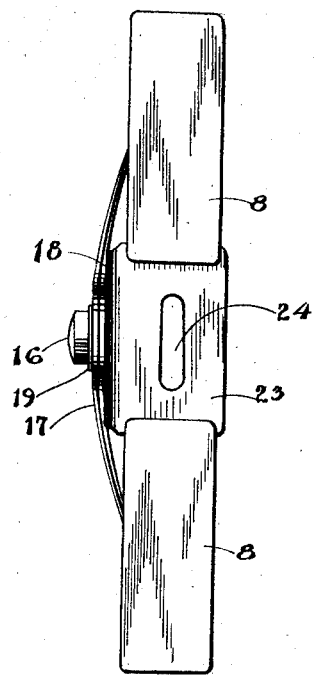
Fig. 2 is an end view of Fig. 1.
Figure 1:
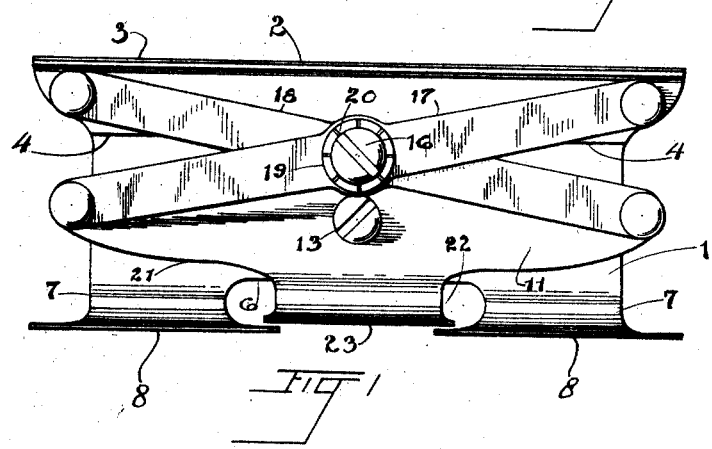
Figure 1 is a view of the tool in side elevation.

The tool comprises the plate 1 approximately oblong in shape and terminating at one side in the longitudinally extending rail 2 the sides of which form straight edges 3, said plate being reduced in diameter to form the longitudinally extending shoulder 4 upon one of its lateral faces, said shoulder being approximately parallel to one of the rail edges 3, said plate being formed with the elongated perforation 5 which lies in the thickened and reduced portions of the plate and that consequently crosses the said shoulder 4, said perforation being disposed at right angles to the rail 2. The plate 1 along its longitudinal edge remote from the rail 2 is recessed, the base of said recess being the edge 6, said recess in reality bifurcating the plate edge and forming the spaced feet 7 which are bent or curved out of the plane of the body of the plate, said feet terminating in the flat and alined, spaced leaves 8 which lie parallel to the rail 2. Extending longitudinally of the recessed portion of the plate and slightly above the base edge 6 thereof is the ledge 9 which is formed at its ends with the feet 10 sweated or soldered to the plate 1 to support said ledge.

To the flat face of the plate 1 opposite to that carrying the feet 10 I secure an adjustable plate 11, one longitudinal edge 12 thereof being spaced away from the shoulder 4 of plate 1, said plate 11 being formed also with a recess extending inwardly from its ledge 12 to receive the retaining screw 13 which connects it to the plate 1, the said recess in plate 1 being in alinement with the perforations 5. The end of screw 13 is disposed in a threaded opening formed in a plug 14 disposed in the said perforation 5, said plug being formed with a wedge-shaped head 15 that is threaded to receive the adjusting screw 16 that pivotally connects the flexible arms 17, 18 that are crossed one over the other, each of said arms connecting the ends of the adjustable plate 11 to the ends of the plate 1 adjacent the rail 2. A collar 19 formed with graduations 20, in degrees, encircles the screw 16 and is fast upon the arm 17. The longitudinal edge 21 of plate 11 is extended to form a reduced neck portion 22 curved out of the plane of the plate proper and terminating in the flared flat head 23 disposed in the space between the ledge 9 and the spaced leaves 8, said head 23 being of greater length than the distance between said leaves 8 so that it overlaps the relatively adjacent ends of the same. The head 23 is formed with the elongated longitudinally extending slot 24. When a screw driver is applied to the slot in the head of the screw 16 and turned in one direction it will cause the lug 14 to ride in its slot thus, through the medium of retaining screw 13, moving the plate 11 relatively to the plate 1 and so moving the head 23 closer to the spaced leaves 8. A reverse movement of the adjusting screw 16 will permit the plate 11 to be manually moved back to its initial position, manual pressure being applied directly to the head 23 to force it away from the said leaves 8. Movement of the screw 16 from one to the next graduation 20 will cause a certain movement of the plate 11 and head 23 which can be computed exactly and any adjustment desired made by reference to such computations.

In use the tool may serve several purposes. It may serve to support a saw blade. The back of the blade may be inserted between the head 23 and leaves 8 and there supported while the saw teeth are being filed or set, the tool being held in a vise or block meanwhile. The tool may be used to firmly hold a file 25 incased in a spring frame 26 which frame is gripped firmly between the ledge 9 and head 23, the upturned flexible ends of the frame 26 bearing upon the file and the points 27 thereof bearing against the leaves 8. The frame 26 is formed with a central longitudinal slot through which the teeth of the saw blade 28 may engage with the file. With the saw blade supported in a block or vise the operator grasps the tool with the rail 2 down as shown in Fig. 5 and files the saw teeth. Either edge 3 of the rail 2 will serve as a straight edge to ride against the saw blade and guide the tool during the filing operation. The tool may be used also as a raker gage. The file frame is removed and the tool placed upon the toothed side of the saw 28 so that the raker teeth 29 may protrude through the slot 24 in the head 23 for filing or dressing. When a raker tooth is filed flush with the head 23 the tool is removed from the saw blade or positioned anew for use in connection with another raker tooth. The tool is, of course, steadied by hand while in position upon the saw blade during the filing operation.

What is claimed is:—

1. In a saw dressing tool, a plate, a rail terminating one edge of said plate, spaced alined leaves terminating the opposite edge of said plate, a second plate adjustably secured to said first named plate, a head terminating said second plate and disposed parallel to and overlapping the adjacent ends of the said leaves, and a ledge secured to the first named plate adjacent the said head and for coöperation therewith.

2. In a saw dressing tool, a plate, a rail terminating one edge of said plate, spaced alined leaves terminating the opposite edge of said plate, a second plate, pivotally connected crossed arms connecting said first named and second plates for retaining them in engagement with each other, means for adjusting the second plate upon the first named plate, a head integral with the second plate and disposed parallel to and between the said leaves and overlapping the adjacent edges of the same, and a ledge carried by said first named plate and spaced away from the said head.

3. In a saw dressing tool, a plate, a rail terminating one edge of said plate, spaced alined leaves terminating the opposite edge of said plate, a second plate adjustably secured to said first named plate, a head terminating said second plate and disposed parallel to and overlapping the adjacent ends of said leaves, a ledge secured to the first named plate adjacent the said head, and a file carrier disposed between the said ledge, head and spaced leaves.

4. In a saw dressing tool, a slotted plate, a rail terminating one edge of said plate, spaced alined leaves terminating the opposite edge of said plate, a grooved second plate, a wedge lug arranged in the slotted portion of said first plate, a retaining screw engaging the grooved portion of said second plate and said lug, an adjusting screw carried by said wedge lug, crossed arms connecting both of said plates and said adjusting screw, a head terminating said second plate and disposed between said alined leaves for coöperation therewith, said head being slotted longitudinally to receive the raker teeth of a saw, and a ledge carried by the first named plate for coöperation with said head.

In testimony that I claim the foregoing as my own I have hereto affixed my signature in the presence of two subscribing witnesses.

CHARLES GUSTAFSON.

Witnesses:
 W. N. SWEET,
 WM. N. SWEET, Jr.